US010671600B1

(12) United States Patent
Bengtson et al.

(10) Patent No.: US 10,671,600 B1
(45) Date of Patent: Jun. 2, 2020

(54) COMMUNICATIONS-ENABLED DYNAMIC SOCIAL NETWORK ROUTING UTILIZING PRESENCE

(75) Inventors: David Charles Bengtson, Centennial, CO (US); Andrew J. Cammer, Hessen (DE); Andrew D. Flockhart, Thornton, CO (US); Eugene Mathews, Marco Island, FL (US); Christopher Moss, Flower Mound, TX (US); Douglas W. Swartz, Lakewood, CO (US); John Z. Taylor, Bedminster, NJ (US)

(73) Assignee: Avaya Inc., Basking Ridge, NJ (US)

( * ) Notice: Subject to any disclaimer, the term of this patent is extended or adjusted under 35 U.S.C. 154(b) by 869 days.

(21) Appl. No.: 11/864,189

(22) Filed: Sep. 28, 2007

Related U.S. Application Data

(60) Provisional application No. 60/951,610, filed on Jul. 24, 2007.

(51) Int. Cl.
*G06F 7/00* (2006.01)
*G06F 17/30* (2006.01)
*G06F 16/24* (2019.01)

(52) U.S. Cl.
CPC .................................. *G06F 16/24* (2019.01)

(58) Field of Classification Search
USPC .......................... 707/999.001, 758; 705/319
See application file for complete search history.

(56) References Cited

U.S. PATENT DOCUMENTS

| | | | |
|---|---|---|---|
| 4,817,130 A | 3/1989 | Frimmel, Jr. | |
| 4,941,168 A | 7/1990 | Kelly, Jr. | |
| 5,206,903 A | 4/1993 | Kohler et al. | |
| 5,430,792 A | 7/1995 | Jesurum et al. | |
| 5,434,908 A | 7/1995 | Klein | |
| 5,511,112 A | 4/1996 | Szlam | |
| 5,555,376 A | 9/1996 | Theimer et al. | |
| 5,619,254 A | 4/1997 | McNelley | |
| 5,619,648 A | 4/1997 | Canale et al. | |
| 5,712,902 A | 1/1998 | Florence et al. | |
| 5,742,763 A | 4/1998 | Jones | |
| 5,802,510 A | 9/1998 | Jones | |
| 5,819,084 A | 10/1998 | Shapiro et al. | |
| 5,826,039 A | 10/1998 | Jones | |

(Continued)

FOREIGN PATENT DOCUMENTS

| | | |
|---|---|---|
| EP | 0 886 416 | 12/1998 |
| EP | 1261179 | 11/2002 |

(Continued)

OTHER PUBLICATIONS

Atkins et al "Common Presence and Instant Messaging: Message Format," Network Working Group (Jan. 9, 2003), available at http://www.ietf.internet-drafts/draft-ietf-impp-cpim-msgfmt-06.txt, 31 pages.

(Continued)

*Primary Examiner* — Hosain T Alam
*Assistant Examiner* — Nicholas Allen
(74) *Attorney, Agent, or Firm* — Sheridan Ross P.C.

(57) ABSTRACT

The present invention is directed to architectures for receiving, from requestors, requests for information, identifying appropriate responders, unknown to the requestors, to provide the requested information, and effecting interactions between the requestors and responders.

19 Claims, 6 Drawing Sheets

(56) References Cited

U.S. PATENT DOCUMENTS

| | | |
|---|---|---|
| 5,828,747 A | 10/1998 | Fisher et al. |
| 5,864,874 A | 1/1999 | Shapiro |
| 5,905,793 A | 5/1999 | Flockhart et al. |
| 5,982,873 A | 11/1999 | Flockhart et al. |
| 6,031,896 A | 2/2000 | Gardell et al. |
| 6,038,296 A | 3/2000 | Brunson et al. |
| 6,046,762 A | 4/2000 | Sonesh et al. |
| 6,088,441 A | 7/2000 | Flockhart et al. |
| 6,094,681 A | 7/2000 | Shaffer et al. |
| 6,128,304 A | 10/2000 | Gardell et al. |
| 6,130,937 A | 10/2000 | Fotta |
| 6,163,607 A | 12/2000 | Bogart et al. |
| 6,173,053 B1 | 1/2001 | Bogart et al. |
| 6,185,603 B1 | 2/2001 | Henderson et al. |
| 6,192,122 B1 | 2/2001 | Flockhart et al. |
| 6,226,360 B1 | 5/2001 | Goldberg et al. |
| 6,298,062 B1 | 10/2001 | Gardell et al. |
| 6,307,931 B1 | 10/2001 | Vaudreuil |
| 6,311,231 B1 | 10/2001 | Bateman et al. |
| 6,317,593 B1 | 11/2001 | Vossler |
| 6,330,243 B1 | 12/2001 | Strandberg |
| 6,330,317 B1 | 12/2001 | Garfinkel |
| 6,332,081 B1 | 12/2001 | Do |
| 6,360,222 B1 | 3/2002 | Quinn |
| 6,411,682 B1 | 6/2002 | Fuller et al. |
| 6,430,271 B1 | 8/2002 | DeJesus et al. |
| 6,430,602 B1 | 8/2002 | Kay et al. |
| 6,449,260 B1 | 9/2002 | Sassin et al. |
| 6,463,471 B1 | 10/2002 | Dreke et al. |
| 6,477,374 B1 | 11/2002 | Shaffer et al. |
| 6,477,543 B1 | 11/2002 | Huang et al. |
| 6,480,484 B2 | 11/2002 | Morton |
| 6,535,600 B1 | 3/2003 | Fisher et al. |
| 6,546,097 B1 | 4/2003 | Peltz |
| 6,549,612 B2 | 4/2003 | Gifford et al. |
| 6,561,805 B2 | 5/2003 | Kumar |
| 6,614,783 B1 | 9/2003 | Sonesh et al. |
| 6,668,167 B2 | 12/2003 | McDowell et al. |
| 6,675,168 B2 | 1/2004 | Shapiro et al. |
| 6,700,967 B2 | 3/2004 | Kleinoder et al. |
| 6,738,462 B1 | 5/2004 | Brunson |
| 6,741,586 B1 | 5/2004 | Schuster et al. |
| 6,788,773 B1 | 9/2004 | Fotta |
| 6,789,120 B1 | 9/2004 | Lee et al. |
| 6,839,735 B2 | 1/2005 | Wong et al. |
| 6,878,924 B2 | 4/2005 | Baron |
| 6,879,677 B2 | 4/2005 | Trandal et al. |
| 6,879,828 B2 | 4/2005 | Virtanen et al. |
| 6,891,933 B2 | 5/2005 | Kumamoto |
| 6,925,166 B1 | 8/2005 | Chan |
| 6,968,052 B2 | 11/2005 | Wullert, II |
| 6,968,179 B1 | 11/2005 | De Vries |
| 6,999,731 B2 | 2/2006 | Cronin |
| 7,023,980 B2 | 4/2006 | Lenard |
| 7,027,987 B1 | 4/2006 | Franz et al. |
| 7,054,939 B2 | 5/2006 | Koch et al. |
| 7,068,762 B2 | 6/2006 | Skladman et al. |
| 7,092,370 B2 | 8/2006 | Jiang et al. |
| 7,158,630 B2 | 1/2007 | Fotta et al. |
| 7,162,473 B2 | 1/2007 | Dumais et al. |
| 7,194,075 B2 | 3/2007 | Fotta |
| 7,246,371 B2 | 7/2007 | Diacakis et al. |
| 7,283,805 B2 | 10/2007 | Agrawal |
| 7,283,808 B2 | 10/2007 | Castell et al. |
| 7,299,259 B2 | 11/2007 | Petroyikh |
| 7,567,965 B2 * | 7/2009 | Giacobbe et al. |
| 7,979,802 B1 * | 7/2011 | Appelman ............... 715/752 |
| 2002/0019829 A1 | 2/2002 | Shapiro |
| 2002/0021307 A1 | 2/2002 | Glenn et al. |
| 2002/0035605 A1 | 3/2002 | McDowell et al. |
| 2002/0052225 A1 | 5/2002 | Davis et al. |
| 2002/0055350 A1 | 5/2002 | Gupte et al. |
| 2002/0055912 A1 | 5/2002 | Buck |
| 2002/0065894 A1 | 5/2002 | Dalai et al. |
| 2002/0076010 A1 | 6/2002 | Sahel |
| 2002/0085701 A1 | 7/2002 | Parsons et al. |
| 2002/0087630 A1 | 7/2002 | Wu |
| 2002/0116336 A1 | 8/2002 | Diacakis et al. |
| 2002/0116461 A1 | 8/2002 | Diacakis et al. |
| 2002/0126701 A1 | 9/2002 | Requena |
| 2003/0014491 A1 | 1/2003 | Horvitz et al. |
| 2003/0018720 A1 | 1/2003 | Chang et al. |
| 2003/0028525 A1 | 2/2003 | Santos et al. |
| 2003/0028621 A1 | 2/2003 | Furlong et al. |
| 2003/0073440 A1 | 4/2003 | Mukhegee et al. |
| 2003/0154293 A1 | 8/2003 | Zmolek |
| 2003/0217073 A1 * | 11/2003 | Walther ............... G06Q 10/109 |
| 2004/0039630 A1 * | 2/2004 | Begole et al. ................ 705/11 |
| 2004/0093290 A1 * | 5/2004 | Doss et al. .................... 705/35 |
| 2004/0120498 A1 | 6/2004 | Sylvain |
| 2004/0141594 A1 | 7/2004 | Brunson |
| 2004/0148275 A1 * | 7/2004 | Achlioptas ..................... 707/3 |
| 2004/0210844 A1 | 10/2004 | Pettinati et al. |
| 2004/0249650 A1 | 12/2004 | Freedman et al. |
| 2005/0021750 A1 * | 1/2005 | Abrams ........................ 709/225 |
| 2005/0047394 A1 | 3/2005 | Hodson et al. |
| 2005/0055450 A1 * | 3/2005 | Gang ........................... 709/228 |
| 2005/0101335 A1 * | 5/2005 | Kelly ................... G06Q 10/109 455/456.3 |
| 2005/0108775 A1 | 5/2005 | Bachar et al. |
| 2005/0132079 A1 | 6/2005 | Iglesia et al. |
| 2005/0154911 A1 * | 7/2005 | Schneider ............. H04L 63/083 726/26 |
| 2005/0159970 A1 * | 7/2005 | Buyukkokten et al. .......... 705/1 |
| 2005/0169446 A1 * | 8/2005 | Randall et al. ............ 379/93.23 |
| 2005/0177614 A1 * | 8/2005 | Bourne ......................... 709/200 |
| 2006/0009994 A1 * | 1/2006 | Hogg et al. ..................... 705/1 |
| 2006/0010206 A1 * | 1/2006 | Apacible ................ H04M 3/436 709/205 |
| 2006/0045029 A1 * | 3/2006 | Ethier .................. H04L 12/1818 370/260 |
| 2006/0080107 A1 | 4/2006 | Hill et al. |
| 2006/0085417 A1 | 4/2006 | John et al. |
| 2006/0288099 A1 * | 12/2006 | Jefferson ............... H04L 12/581 709/224 |
| 2007/0005654 A1 * | 1/2007 | Schachar et al. ........... 707/104.1 |
| 2007/0027921 A1 * | 2/2007 | Alvarado ............. G06Q 10/109 |
| 2007/0150608 A1 * | 6/2007 | Randall ................... H04L 67/26 709/228 |
| 2007/0162569 A1 * | 7/2007 | Robinson et al. ............. 709/219 |
| 2007/0167170 A1 * | 7/2007 | Fitchett ............. H04L 29/06027 455/456.1 |
| 2008/0003964 A1 | 1/2008 | Alperin et al. |
| 2008/0005073 A1 * | 1/2008 | Meek et al. ..................... 707/3 |
| 2008/0070550 A1 * | 3/2008 | Hose ......................... 455/411 |
| 2008/0077529 A1 * | 3/2008 | Swanburg ..................... 705/45 |
| 2008/0086531 A1 * | 4/2008 | Chavda et al. ............. 709/206 |
| 2008/0086551 A1 * | 4/2008 | Moy ........................... 709/223 |
| 2008/0114737 A1 * | 5/2008 | Neely et al. ..................... 707/3 |
| 2008/0120261 A1 * | 5/2008 | John et al. ..................... 706/45 |

FOREIGN PATENT DOCUMENTS

| | | |
|---|---|---|
| JP | 9-200813 | 7/1997 |
| JP | 2002-176449 | 6/2002 |
| JP | 2003-8655 | 1/2003 |
| JP | 2003-122834 | 4/2003 |
| JP | 2004-192521 | 7/2004 |
| JP | 2004-343220 | 12/2004 |
| WO | WO 00/39964 | 7/2000 |
| WO | WO 00/69140 | 11/2000 |
| WO | WO 01/55915 | 8/2001 |
| WO | WO 01/69387 | 9/2001 |
| WO | WO 02/30105 | 4/2002 |
| WO | WO 03/025776 | 3/2003 |
| WO | WO 03/069364 | 8/2003 |

OTHER PUBLICATIONS

Berners-Lee et al.; "Uniform Resource Identifiers (URI); Generic Syntax," Network Working Group, Request for Comments 2396 (Aug. 1998), 38 pages.

(56) References Cited

OTHER PUBLICATIONS

Bill Michael, The Politics of Naming www.cConvergence.com (Jul. 2001) pp. 31-35.
CC News: Call Center Technology, "FaceTime gives voice, vision to instant messaging", available at http://www.ccnews.com/may2000/depts/cct/cctstory2.htm, 2 pages; Copyright 2000, 1999.
Chavez et al., "Interactive Applications of Personal Situation-Aware Assistants", Computers and Graphics, Pergamon Press LTD., Oxford, GB, vol. 23, No. 6, Dec. 1999, pp. 903-915, XP 004187839, ISSN: 0097-8493.
CommWeb.com "Enterprise Customer Interfaces: Application Messaging Via Instant Messaging" (Dec. 9, 2002) , available at http://www.commweb.com/article/COM20021209S0001/2, 3 pages.
CosmoCall Universe™, "The Carrier-Grade, All-IP Contact Center Platform for Next Generation Network-Based Services" (2002) 3 pages.
CosmoCall Universe™, "The Next Generation IP Contact Center Platform", available at http://www.cosmocom.com/ProductInfo/Product.htm, 18 pages, 1997-2003.
Crocker et al. "Common Presence and Instant Messaging (CPIM)," Network Working Group (Aug. 14, 2002), available at http://www.ietf.internet-drafts/draft-ietf-impp-cpim-03.txt, 33 pages.
Dawson et al.; "Vcard MIME Directory Profile," Network Working Group (Sep. 1998), available at http://www.ietf.org/rfc/rfc2426.txt?number=2426, 40 pages.
Day et al. "A Model for Presence and Instant Messaging," Network Working Group (Feb. 2000), available at http://wwvv.ietf.org/rfc/rfc2277.txt?number=2778, 16 pages.
e-Vantage Solutions, "Customer Service Window", available at http://www.evgl.com/dsw.html, 2 pages, 2003.
FaceTime Communications Press Release, "Amica Insurance Selects FaceTime Communications to Provide Instant Messaging-Based Customer Service in Enterprise" (Jun. 25, 2001), available at http://www.factime.com/pr/pr010625.shtm, 2 pages.
FaceTime Communications website, "Customer Services", available at http://www.facetime.com/custsvcs.shtm, 4 pages, 2003.
FaceTime Communications website, "Overview", available at http://www.facetime.com/solutions.shtm, 4 pages, 2003.
FaceTime Communications website, "Presence Management", available at http://www.facetime.com/presence.shtm, 3 pages, 2003.
Fielding et al.; "Hypertext Transfer Protocol—HTTP/1.1," Network Working Group, Request for Comments 2068 (Jan. 1997), 152 pages.
G. Klyne et al., "Instant Messaging using APEX", Network Working Group, Jun. 1, 2001, 19 pages.
G. Klyne; "A Syntax for Describing Media Feature Sets," Network Working Group (Mar. 1999), available at http://www.ietf.org/rfc/rfc2533.txt?number=2533, 35 pages.
G. Klyne; "Protocol-independent Content Negotiation Framework," Network Working Group (Sep. 1999), available at http://www.ietf.org/rfc/rfc2703.txt?number=2703, 19 pages.
Grigonis, Computer Technology Encyclopedia (2000) pp. 342-345, 389-392.
Gulbrandsen et al.; "A DNS RR for Specifying the Location of Services (DNS SRV)," Network Working Group (Feb. 2000), available at http://www.ietf.org/rfc/rfc2782.txt?number=2782, 12 pages.
Holtman et al.; "HTTP Remote Variant Selection Algorithm—RVSA/1.0," Network Working Group (Mar. 1998), available at http://www.ietf.org/rfc/rfc2296.txt?number=2296, 13 pages.
Holtman et al.; "Transparent Content Negotiation in HTTP," Network Working Group (Mar. 1998), available at http://www.ietf.org/rfc/rfc2295.txt?number=2295, 55 pages.
J. Rosenberg et al., "SIP extensions for Instant Messaging", Internet Engineering Task Force, Jul. 18, 2001, 22 pages.
Live2Support, "Features", Available at http://web.archive.org/web/20040206215142/www.live2support.com/features_live_chat.php>, undated, 4 pages.
"MIT Project Oxygen Publications", 2 pages, undated.

MIT Project Oxygen, "Oxygen: Pervasive, Human-Centered Computing" MIT Laboratory for Computer Science, MIT Artificial Intelligence Laboratory (May 2002).
Ovisoft Technologies, "Ovisoft Messenger—Call Center Solutions", available at http://www.ofisoft.com/solutioncallcenter.htm, 1 page, 2003.
Richard Grigonis, Computer Telephony Encyclopedia (2000) pp. 367-375.
Richard Grigonis,. Computer Telephony Encyclopedia (2000) pp. 413-430.
Richard Shockey, "ENUM: Phone Numbers Meet the Net", www.cConveroence.corn (Jul. 2001) pp. 21-30.
Rose et al.. "The APEX Presence Service," Network Working Group (Jan. 14, 2002), available at http://www.ieff.org/internet-drafs/draft-ielf-apex-presence-06.txt, 31 pages.
Schulzrinne, H., et al., "The Session Initiation Protocol: Internet-Centric Signaling", IEEE Communications Magazine (Oct. 2000), vol. 38, No. 10, pp. 134-141.
Stephanie Losi, "Instant Messaging for Call Centers Leaves 'Em Smiling" www.CRMDaily.com (Jun. 4, 2001), available at http://www.newsfactor.com/perl/story/10246.html, 3 pages.
Sugano et al, "Common Presence and Instant Messaging (CPIM) Presence Information Data Format," Network Working Group (Dec. 2002), available at http://www.lettorofinternet-drafts/draft-Ietf-impo-cnim-oidf-07.bct, 26 pages.
The MIT Oxygen Project, Cambridge, MA, Apr. 25-26, 2000.
Trudy Walsh, "Instant messaging boosts service at Texas call center" GCN (Nov. 2001), available at http://www.gcn.com/cgi-bin/udt/im.display.printable?client.id=state2&story.id=16765, 2 pages.
Venus Valley, "Live chat for your website", Available at http://www.pppindia.com/vvchat/shots.htm>, Venus Valley Live Support, 2003, 2 pages.
WiredRed News Release, "WiredRed to Provide Secure Instant Messaging for Eight New Call Center Customers", available at http://www.wiredred.com/news_release_callctr.html, 2 pages, Sep. 28, 2002.
XML-NS Tim Bray et al., "Namespaces in XML", W3C recommendation: xml-names, Jan. 14, 1999, 12 pages.
"Phone Mail Override for Incoming Calls", IBM Technical Disclosure Bulletin, vol. 37, No. 11, Nov. 1994.
Steven Cherry, "Total Recall," IEEE Spectrum, Nov. 2005, pp. 24-30, IEEE.
Curt Franklin, "How Internet Search Engines Work," 6 pages, 2000, How Stuff Works, available at http://computer.howstuffworks.com/search-engine1.htm.
Encounter Collaborative "Audio and Web Conferencing . . . made easy!", 2 pages, 2005 Encounter Collaborative, available at http://www.encounter.net/home/.
Interactive Intelligence, Products & Solutions, Multimedia recording and scoring "Interaction Recorder"; 3 pages; 2006; Interactive Intelligence Inc.; available at http://www.inin.com/products/recorder/recorder.asp.
NCH Swift Sound "VRS Recording System-Professional Audio Recording Software," 5 pages, NCH Swift Sound, available at http://www.nch.com.au/vrs/.
Activa Solutions "VoIP Recording Solutions," 2 pages, undated, Activa Solutions, available at http://www.activa.co.uk/products_voip_recording.php.
Zoom International "IP Recording Solution, Enterprise and Hosted Deployment, Live Monitoring, Screen Capture and Quality Management"; 2 pages; 2006; Zoom International; available at http://www.zoom-int.cz/en/index.php.
Andtek "AND Phone Recorder IP Telephony Call Recording," 2 pages, 2006 AndtekGmbH, available at http://recorder.andtek.com/product-recorder.html?language=english.
Rays Lab "Advanced Call Recorder-your phone calls recorder," 2 pages, 2006, Rayslab, Inc., available at http://www.rayslab.com/call_recorder/.
Spescom DataVoice "DataVoice IP Recorder for Cisco AVVID," 4 pages, 2004, Spescom, available at http://www.datavoice.spescom.com/content.asp?menuID=82.

(56) References Cited

OTHER PUBLICATIONS

PBXpress "PBXpress-Call Recording VoIP PBX," 5 pages,Jan. 5, 2006, PBXpress Communications, Inc., available at http://www.pbxpress.com.
Red Box Recorders "Products," 2 pages, undated,available at http://www.redboxrecorders.com/newproducts.shtml.
The Sonic Spot "Audio File Formats", 5 pages, 2006, Sonic Spot, available at http://www.sonicspot.com/guide/fileformatlist.html.
"Video Conferencing, Web Conferencing & Online Meeting Software," 6 pages, 2005, WiredRed Software, available at http://www.wiredred.com.
Day et al., "Instant Messaging / Presence Protocol Requirements", Network Working Group, Feb. 2000, 25 pages.
Uhlig et al. "Designing BGP-based outbound traffic engineering techniques for stub ASes", date unknown, pp. 1-17.
Oiu et al., "On Selfish Routing in Internet-Like Environments", SIGCOMM'03, Aug. 25-29, Karlsruhe, Germany, pp. 151-162.
Akella et al. "A Measurement-Based Analysis of Multihoming", SIGCOMM'03, Aug. 25-29, Karlsruhe, Germany, pp. 353-364.
Nakao et al. "A Routing Underlay for Overlay Networks", SIGCOMM'03, Aug. 25-29, Karlsruhe, Germany, pp. 11-18.
Goldenberg et al. "Optimizing cost and Performance for Multihoming", SIGCOMM'04, Aug. 30-Sep. 3, 2004, Portland, Oregon, USA, 14 pages.
Akella et al. "A Comparison of Overlay Routing and Multihoming Route Control", SIGCOMM'04, Aug. 30-Sep. 3, 2004, Portland, Oregon, USA, 14 pages.
Labovitz et al. "Delayed Internet Routing Convergence", SIGCOMM'00, Stockholm, Sweden, Copyright 2000, pp. 175-187.
Lloyd "On the performance characteristics of BGP routing decisions", Route Science, ISMA 2001, slides 1-19.
NCH Swift Sound "VRS Recording System-Professional Multi-Channel Audio and Telephone recorder Software", NCH Swift Sound, available at http://www.nch.com.au/vrs/index.html, printed Jul. 29, 2008, pp. 1-3.
Forman "Contact Networks Makes Making Connections Easier", Mass High Tech Mar. 28, 2005, pp. 1-2.
Liben-Nowell et al., "Geographic routing in social networks", PNAS, Aug. 16, 2005, vol. 102, No. 33, pp. 11623-11628.
Ni "Selfish Routing in Social Networks", Senior Design Projects, University of Pennsylvania, 2004-2005, pp. 1-14.
Background of the Invention for the above-captioned application (previously provided).

\* cited by examiner

The following persons are responsive to your request:

| Person | Position | Available | |
|---|---|---|---|
| 1) John Smith | Sales  604a ☐ | 6/1/2007 10:00AM - 2:00PM | |
| | | 6/3/2007 11:00AM - 1:00PM | |
| 2) John Hancock | Technical Support  604b ☒ | 6/5/2007 2:00PM - 4:00PM | |
| 3) Mary Jones | Sales  604c ☐ | 6/1/2007 10:00AM - 12:00PM | |
| | | 6/2/2007 10:00AM - 11:00PM | |
| 4) Jesse James | Technical Support  604d ☐ | 6/3/2007 3:00PM - 5:00PM | |

[Send] 608  [New Search] 612

Fig. 6

COMMUNICATIONS-ENABLED DYNAMIC SOCIAL NETWORK ROUTING UTILIZING PRESENCE

CROSS REFERENCE TO RELATED APPLICATIONS

The present application claims the benefits of U.S. Provisional Application Ser. No. 60/951,610, filed Jul. 24, 2007, entitled "COMMUNICATIONS-ENABLED DYNAMIC SOCIAL NETWORK ROUTING UTILIZING PRESENCE", which is incorporated herein by this reference in its entirety.

Cross reference is made to U.S. patent application Ser. No. 11/538,730, filed Oct. 4, 2007, entitled "IP Telephony Architecture Including Information Storage and Retrieval System to Track Fluency", which is incorporated herein by this reference in its entirety.

FIELD OF THE INVENTION

The invention relates generally to architectures for matching unrelated persons and particularly to architectures for assisting persons in identifying appropriate persons with whom to interact and effecting the interaction.

BACKGROUND OF THE INVENTION

The convergence of the mobile telephone network, the static telephone network, and the IP network provides a myriad of communication options for users. If one seeks to contact another individual, he or she may do so by electronic mail or e-mail, instant messaging, Short Message Service (SMS), wired or wireless telephone, personal computer, pager, personal digital assistant or PDA, and Unified Messaging or UM systems, to name but a few. These options open up new possibilities not only for identifying and introducing unrelated persons with similar interests, passions, beliefs, experiences, or needs but also for identifying and introducing to a requestor an unrelated person having a skill able to meet the requestor's needs.

Prior to network convergence, such introductions by transmitted signals were commonly effected by skills-based routing in contact centers. Contact centers employ work distribution algorithms to pair incoming contacts with human agents. Contact centers can also set up meetings between parties unknown to each other by voice contact or Web server. If party A wishes to set up a telephonic meeting with an agent or party B for example, party A calls or emails the business associated with party B and requests customer assistance. In the contact center paradigm, the work distribution algorithm collects information about party A and the purpose of the contact and then selects an appropriate agent (party B) to service the contact. The servicing session may occur immediately thereafter or be scheduled by the contact center for a later time. In a Web browsing session, the request for assistance is sent by the Web browser to the Web server. The request is then directed to the work distribution algorithm. The logic then proceeds as in the prior example. Contact centers, however, use attributes or skills associated with talents acquired by agents via training. They do not consider, in matching persons, social network attributes, such as interests, passions, beliefs, experiences, or needs.

Post-network-convergence examples of interpersonal communication architectures, include email lists, bulletin boards, and blogs. These mechanisms, however, are generally slow, inefficient, and may result in sub-optimal pairings of persons and, as a result, low quality information transfer to an interested person. It is generally not possible to create in advance the ideal mailing list of individuals or a sufficient number of bulletin boards or blogs that will have the ideal membership for a specific question. In the prior art, someone may send an email question to a mailing list of several hundred people or submit a question to a bulletin board or blog with several hundred members. This is highly inefficient when there may be only a very small number of individuals who are truly capable of answering this specific question. The result is that several hundred people waste time considering the proffered question, and that the requestor may receive many answers of varying accuracy and quality and may have to wait hours or even days before such answers are received.

The need for an effective interpersonal communication architecture is illustrated by the rise in importance to product loyalty of peer-promotion or word-of-mouth recommendations of current customers utilizing a product or service. Traditional forms of marketing, such as advertising, direct mail, and the like, are becoming less and less effective. Much of the recommendations made for a particular product or service occur as random events. Examples include chance meetings in social settings, anecdotal or historical comments, and/or in scenarios where close human proximity occurs, such as airplanes, trains, buses, and the like. The challenge for companies is that there is no structured way to control these events from occurring or not. The events are superfluous and random, yet critical to the future success of global businesses. Companies are becoming less and less able to influence these occurrences in a specific and structured manner. They are also hindered by the fact that there is a geographical dispersion occurring in their product promoters. These individuals may be located any place at any time and in a totally different locale than a potential new customer who is considering the product.

Even if unrelated persons are identified and introduced to one another, there is no mechanism for scheduling a communication session until they have exchanged contact information and manually initiate a meeting. Current meeting schedulers or calendar modules use invitations transmitted between known and specified parties to set up meetings. The invitation fields are manually inputted by one of the parties after they are made known to one another. There is limited ability of persons unknown to one another or unspecified in the invitation to use invitations to set up meetings.

There is thus a need for an interpersonal identification and introduction architecture that is fast, accurate, and efficient.

SUMMARY OF THE INVENTION

These and other needs are addressed by the various embodiments and configurations of the present invention.

The following presents a simplified summary of the invention to provide an understanding of some aspects of the invention. This summary is not an extensive overview of the invention and its various embodiments. It is intended neither to identify key or critical elements of the invention nor to delineate the scope of the invention but to present selected concepts of the invention in a simplified form as an introduction to the more detailed description presented below.

The present invention(s) is directed generally to methods and architectures for receiving, from requestors, requests for information, identifying appropriate responders, unknown to the requestors, to provide the requested information, and effecting interactions between the requestors and responders.

In a first invention, a method is provided that includes the steps of:

(a) providing a social network structure having a number of otherwise unrelated members, the members being characterized by a common interest, passion, belief, experience, and/or need and having associated communication devices;

(b) receiving, from a requestor, a social network request including member attributes to be searched;

(c) in response, selecting a social network of social network members having the searched attributes; and (d) providing, to the requestor, member information for the members of the social network.

In one configuration, most of the social network structure members do not know one another personally, are not employed by a common business entity, and are members of the general public. Some of the attributes are related to the common interest, passion, belief, experience, and/or need of the social network structure.

To effect member identification, the social network structure includes one or more data stores that include member information. The member information includes, for each member, one or more of a role identifier indicating one or more of the member's position or hierarchy in the structure or the common interest, passion, belief, experience, and/or need; contact information for the member's associated communication devices; and why the member is part of the structure.

The method can further provide, to the requestor, presence and/or availability information for the members of the social network; and, in response to requestor input, effect a communication session with the requestor and one or more of the social network members.

Alternatively, the method can, in response to requestor input, schedule a communication session with the requestor and one or more of the social network members.

In one configuration, the requestor-receiver architecture is a communications paradigm that leverages presence within a social network model, where the requestor is an individual, firm or entity seeking to contact a social network of individuals with attributes of interest. The paradigm can allow for a "dynamic" assembly of a group of social network members based on certain characteristics or on static, pre-acquired criteria. These attributes could have a wide array of characteristics. Exemplary characteristics include, "Do you use the product I am considering?", "Would you recommend this bank for service?", "Do you think I should buy a Saturn Vue SUV?", among others. The paradigm assesses the request and acts as a central point for collection, status, and availability by communications channel (e.g., land line, cell phone, email, chat, web, SMS, etc.) of those in the target/ad hoc social network. Participation in the social network for this purpose is based upon a volunteer/common interest basis or on an economic basis, where sponsoring entities would provide renumeration for those actively participating in the social network to act as peer promoters, recommenders, or advisors. The paradigm can match, in real time, those individuals within, or without the social network with those social network members possessing the requested attribute(s). The paradigm maintains an inventory and communication status of those in the social network. Communications with social network member(s) are facilitated by requesting a set of static characteristics (e.g., members having one or more contact/interest, passions, etc.) during the phase of "joining" the social network or even dynamic characteristics, such as geographical proximity based upon real time location (e.g., "Could any acoustic guitar music fans in the Lafayette, Colo. area recommend a place where I could catch some good live music?", "Where do people recommend I get my Volvo repaired near Long Valley, New Jersey?, and the like"). The paradigm is multimodal, which can allow the communications paradigm to be device and location independent.

This invention can provide a number of benefits. It can set up interactions between otherwise unknown and unrelated parties based on common interests, passions, beliefs, experiences, and/or needs. This can be done in a relatively fast, accurate, and efficient manner. It can provide near-optimal pairings and, as a result, provide high quality information to an interested person. It can match individuals dynamically. It can embed purposefulness and intentionality to the social network paradigm and provide a structured way for vendors and service providers to market by facilitating and controlling peer promotion and word-of-mouth recommendations. Facilitating and controlling peer promotion and recommendations can provide increased levels of product or service loyalty. It can eliminate boundaries and barriers to people obtaining the information they desire.

In a further invention, a method is provided that includes the steps of:

(a) an enterprise network receiving, from a requestor, an electronic request for a meeting with an unspecified enterprise resource;

(b) in response the enterprise network automatically selecting, from among a set of possible enterprise resources, a preferred subset of enterprise resources to interact with the requestor, the selection being based on information contained in the request;

(c) an electronic calendar module at the enterprise network accessing automatically an electronic calendar of each subset member and determining possible meeting times between the requestor and subset member;

(d) transmitting, by the enterprise network, to the requestor a message containing one or more of the possible meeting times;

(e) receiving a meeting time; and (f) scheduling a meeting with a subset member at the received meeting time.

In one configuration, the subset members are selected based on one or more of resource skills, resource availability, resource preferences, a role identifier of the resource in the enterprise, prior interaction between the requestor and resource, a group identifier of the resource, requestor importance to the enterprise, and a need of the requestor in the request.

The request is typically generated by the electronic calendar module of the requestor and the meeting time transmitted by the requestor's electronic calendar module.

This invention can be seamless to the sender and selected group member. The enterprise resource does not need to be involved in selecting a meeting time with the requestor. It does not require the cumbersome steps in existing contact centers for scheduling a call back. It can provide both requestor and enterprise network the ability to select a meeting type from among a number of differing meeting types. Contact centers are relatively inflexible in scheduling later meetings with agents. Generally, contact centers are configured only for call backs and not for other communication modalities. It can schedule meetings between otherwise unknown and unspecified parties. Current meeting schedulers use invitations transmitted between known and specified parties to set up meetings. There is no capability for parties unknown to each other or unspecified in the invitation to use invitations to set up meetings. It can eliminate the need for an attendant to receive calls in an organization. A work item distribution module and electronic calendar module can jointly select a "best fit" enterprise group member or resource and configure a meeting between the requestor and group member.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The term "social network" means a grouping of people having a common characteristic, such as having common interests, passions, beliefs, experiences, and/or needs. The characteristic may be positive or negative. For example, pro-republican persons are members of a pro-republican party social network infrastructure while anti-republication persons are members of an anti-republican social network. In one configuration, at least most of the social network structure members do not know one another personally, are not employed by a common business entity, and are also members of the general public. In another configuration, the social network is a social structure made of nodes which are generally individuals or organizations. It indicates the ways in which they are connected through various social familiarities ranging from casual acquaintance to close familial bonds.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 6 is a screenshot according to an embodiment of the present invention.

DETAILED DESCRIPTION

The Social Network Embodiment

Figure 1:
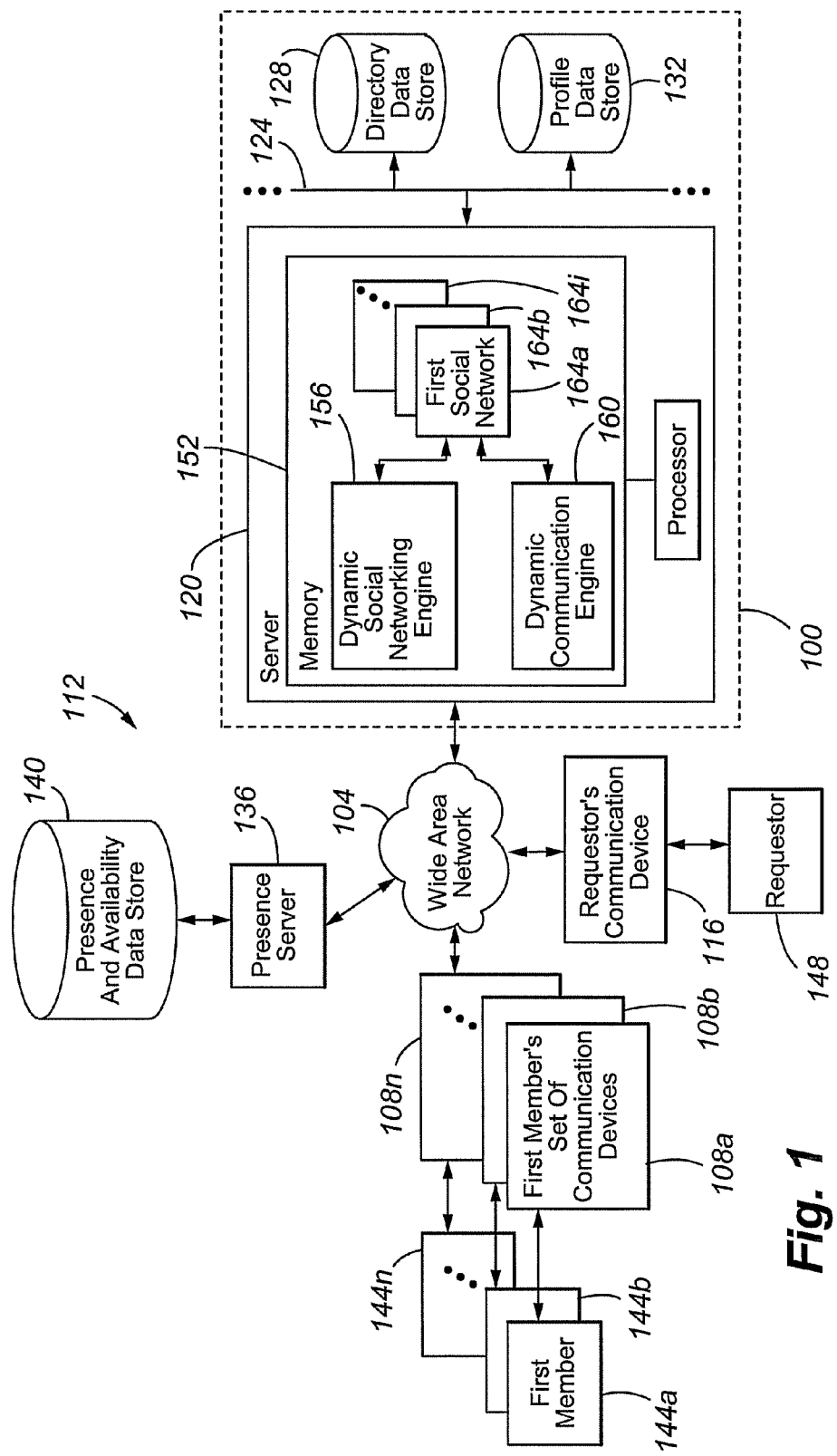
FIG. 1 is a block diagram of an architecture according to an embodiment of the present invention.

According to a first embodiment of the present invention, an enterprise network 100 is interconnected by the Wide Area Network (WAN) 104 with first, second, . . . nth member's sets of communication devices 108*a-n*, presence service 112, and requestor's communication device 116. The enterprise network 100 includes a server 120 connected by Local Area Network (LAN) 124 with a directory data store 128 and profile data store 132.

The server 120 receives and responds to social network requests from client communication devices. Any suitable server may be employed that has been modified according to the principles of the present invention. Preferably, the server 120 is a WEB server configured to interact with clients using the TCP/IP suite of protocols. The server 120 can thus receive and respond to GET and POST requests defined by the HyperText Transfer Protocol or HTTP and graphically render information to clients in a suitable markup language, such as HyperText Markup Language or HTML.

The directory data store 128 comprises sets of data structures associated with members 144. The data structures typically include, for a selected member 144, member identifier (e.g., name or other substantially unique identifier), member home and/or business address, personal website address, contact information or athibutes (e.g., types of communication modalities available to the member (e.g., circuit-switched voice, packet-switched voice, email, instant messaging, SMS, and the like), electronic addresses associated with each modality (e.g., telephone address, email address, instant messaging handle, and the like), and media capabilities of the members of the sets of communication devices (e.g., voice-capable, text-capable, video-capable, and the like)), address or pointer to the selected member's presence service 112, and role identifier (which indicates the selected member's position or hierarchy in the enterprise operator and/or network 100 and/or social network infrastructure). Examples of role identifiers include employee or nonemployee, job title or position, subscriber or nonsubscriber of enterprise network 100, and role vis a vis the stated interests, passions, beliefs, experiences, and/or needs of the social network infrastructure (e.g., if the stated interest is BMW owners the role identifier could indicate whether the selected member is a current BMW owner, past BMW owner, BMW dealer, BMW mechanic, and the like).

The profile data store 132 comprises sets of data structures also associated with members 144. The data structures commonly include, for a selected member 144, member identifier, member home and/or business address, member demographic information (e.g., age, sex, number and ages of children, marital status, employment status, and the like), why the selected member is a member (i.e., the selected member's interests (e.g., political party affiliation for a politically oriented social network infrastructure, etc.), passions (e.g., sporting team affiliation(s) (for a sports oriented social network infrastructure), etc.), beliefs (e.g., church denomination for a Christian social network infrastructure, etc.), skills (e.g., legal practice type for a lawyer social network infrastructure, etc.), experiences (e.g., mountain peaks climbed for a mountain climbing social network infrastructure, etc.), and/or needs (e.g., ages of children for a parenting social network infrastructure)).

The WAN 104 can be any distributed network, whether packet-switched or circuit-switched. In one configuration, the WAN 104 includes a circuit-switched network, such as the Public Switch Telephone Network or PSTN, and a packet-switched network, such as the Internet. In another configuration, WAN 104 includes only one or more packet-switched networks, such as the Internet.

The presence service 112, which may or may not be operated by the enterprise, includes a presence server 136 and associated presence information database 140. The presence server 136 and presence information database 140 collectively track the presence and/or availability of subscribers and provide, to requesting communication devices, current presence and availability information respecting selected subscribers. As used herein, "presence information" refers to any information associated with a network node and/or endpoint device, such as a communication device, that is in turn associated with a person or identity. Presence information generally indicates what kind of context the contactee is in and what kind of communication, if any, is appropriate to reach successfully the contactee. Examples of presence information include information regarding the accessibility of the endpoint device, registration information, the recency of use of the endpoint device by the person, recency of authentication by the person to a network component, and the preferences of the person (e.g., contact mode preferences or profiles such as the communication device to be contacted for specific types of contacts or under specified factual scenarios, contact time preferences, impermissible contact types and/or subjects such as subjects about which the person does not wish to be contacted, and permissible contact type and/or subjects such as subjects about which the person does wish to be contacted). Presence information can be user configurable, i.e., the user can configure the number and type of communications and message devices with which they can be accessed and to define different profiles that define the communications and messaging options presented to incoming contactors in specified factual situations. By identifying predefined facts, the system can retrieve and follow the appropriate profile.

The first, second, . . . nth sets of communication devices 108a-n and requestor's communication device 116 are preferably circuit-switched packet-switched communication devices, such as analog or digital telephones, IP hardphones (e.g., Avaya Inc.'s 4600 Series IP Phones™), IP softphones (e.g., Avaya Inc.'s IP Softphone™), Personal Digital Assistants or PDAs, Personal Computers or PCs, laptops, packet-based H.320 video phones and conferencing units, packet-based voice messaging and response units, peer-to-peer based communication devices, and packet-based traditional computer telephony adjuncts. Examples of suitable devices are the 4610™, 4621SW™, and 9620™ IP telephones of Avaya, Inc. Each set 108a-n of communication devices typically include one or more member communication devices of the types noted above.

The sets of communication devices 108a-n are associated with first, second, . . . nth members 144a-n. The members 144 are members of a social network infrastructure and may be subscribers or nonsubscribers to the enterprise network 100. Accordingly, the members of the sets 108 of communication devices may be internal or external to the enterprise network 100. An "external" communication device is not controlled by an enterprise switch/server (e.g., does not have an extension serviced by the switch/server) while an "internal" device is controlled by an enterprise switch/server. Although the members 144 may be known personally to one another, they are typically not related and not personally acquainted with one another. Interactions among them tend to be sporadic and random. The requestor 148 may or may not be a member of the social network infrastructure.

The members are typically unrelated and unknown to one another. For example, they are typically not employed by or otherwise affiliated with a common enterprise and have no personal relationship with one another. They often are not in geographical proximity to one another but geographically distributed or dislocated. They commonly interact with one another on an infrequent or random basis. They are members because they share complementary or common interests, passions, beliefs, experiences, or needs.

The enterprise network 100 can be maintained by a subset of the members or by a business entity funded by the members or others. For example, the enterprise network 100 can be the American Association of Retired Persons or AARP and the members being retired and/or advanced in years. The enterprise network 100 may be maintained by a business entity that is a vendor or service provider whose clientele or customers are the members. The information collected in the data stores 128 and 132 is typically collected from members with their consent to avoid privacy violations. The enterprise network 100 may be funded not only by the members but also by advertising reveneue received from vendors and service providers in exchange for advertisements included in electronic messages to the members. Members can join the social network infrastructure based on advertisements provided to the public, such as via the Internet, or be recruited by other members and/or by a vendor or service provider. For example, members can be subscribers to a magazine or other publication or a service, such as America On Line or purchasers of a type or make of product.

Included in the memory 152 of the server 120 are a number of computational modules for identifying and matching social network infrastructure participants. A dynamic social networking engine 156 accepts qualifying attributes from a social network request from a requester's communication device 116, accesses the directory and profile data stores 128 and 132, and the presence service 112 to create dynamically a social network. The social network represents, as of the time of receipt of the network request, a subset of the members 144 having the attributes in the social network request. A later request having the same attributes may provide a different subset of members 144. A dynamic communication engine 160 takes a selected social network 164 as input and requests or schedules the establishment of some kind of media communication between the requestor 116 and members 144 of the network. Examples would include a voice conference, video conference, instant messaging group, SMS broadcast, email list, and text chat. In setting up communication sessions, the dynamic communication engine 160 works with a communications services layer (not shown) (which is an interface providing access to communication services for the engine 160) and communications infrastructure layer (not shown) (which is an interface providing access to communication devices offering selected multimedia communications capabilities).

The first, second, . . . ith social networks 164*a-i* are data objects containing all information needed for the dynamic communication engine 160 to establish a communication session between/among the requestor 148 and a set of selected members 144. The data objects typically include the communications attributes associated with the selected members 144 in the social network and the type(s) of session(s) to be established. By way of illustration, the data objects commonly include electronic communication device addresses and media capabilities, when the requested session should be established, meeting invite instructions for a scheduling application (not shown) of the enterprise network (e.g., invitees, subject, label, start and end times, reminder settings, show time as (busy, free, tentative, or out of office), meeting, workspace link, and other information (e.g., agenda, instructions, requests, and the like)) passwords, and the like.

A few examples will now be presented to illustrate the operation of the present invention.

In a first example, assume that the requestor 148 is an employee of a telecommunications company. Requestor 148 is having lunch with a customer at a conference, and the customer has shown considerable interest in the company's self-service solutions. The customer says they would require Session Initiation Protocol or SIP interoperability between the gateway and voice portal and wants to know when that will be available. The requestor 148 is unsure of the answer, and the conversation stalls.

The requestor 148 realizes that there is a real opportunity for a sale if she can obtain the answer during the lunch. She decides that the best people to answer this question might be the product manager, architect or system engineers of the voice portal project. She does not know who these people are, but it does not matter; the system 100 will locate them for her. She pulls out her handheld device with a Personal Communications Center (PCC) client and starts to create a dynamic social network.

She enters qualifying attributes as follows:
Product=Voice Portal
JobTitle=Product Manager or Architect or System Engineer
Presence=Available The attributes are forwarded to the dynamic social networking engine 156 in a social network request. The server 120 finds one VP product manager and one VP architect who are available.

She requests the dynamic communication engine 160 to set up an immediate voice conference with both.

In this example, the social network infrastructure is the employment of the telecommunications company. The next example illustrates a social network infrastructure in which the members have no pre-existing business or personal relationship.

In a next example, the requestor 148 has been sent on assignment to Dubai. He owns a BMW which requires servicing or repair and wishes to speak to some local people to get recommendations for the best repair centers in Dubai.

In his PCC client, he enters qualifying attributes:
Location=Dubai
Automobile=BMW
Language=English The attributes are forwarded to the dynamic social networking engine 156 in a social network request. The server 120 responds with a social network of 200 people.

He further refines his search to reduce the number of people.
Location=Dubai
Automobile=BMW
Language=English
Nationality=American
Presence=Available The server 120 responds with a dynamic social network of 4 people.

Using the dynamic communication engine 160, he sets up an instant messaging group and requests recommendations for BMW service centers.

In yet another example, a requestor is considering an automotive purchase and would like a positive and negative recommendation for a Lexus LS400. The requestor provides the following attributes:
Manufacturer=Lexus
Model=LS400
Language=English
Recommendation=positive
Recommendation=negative The server 120 responds with a social network of four people, three having positive recommendations and one having a negative recommendation. Using the engine 160, the requestor sets up a text chat.

The operation of the network 100 will now be discussed with reference to FIGS. 2-4.

In step 200, the server 120 receives a social network request from the requestor's communication device 116. The dynamic social networking engine 156 parses the request and identifies the attributes to be searched.

In step 204, the engine 156 forwards a search query to the profile data store 132 to identify a subset of social network members 144 matching the attributes in the search query.

In step 208, the engine 156 receives and optionally filters the results. Filtration may be required where one or more of the subset members has stipulated limitations on the distribution of his or her profile or parts thereof to other members and/or nonmembers.

In step 212, the engine 156 generates and forwards the search query to the directory data store 128 seeking contact information for each of the members in the subset or filtered subset.

In step 216, the engine 156 receives the results and generates and sends presence and availability queries to the presence service 136 of each member in the subset or filtered subset. The engine 156 seeks to determine which of the members are currently available. This step may be unnecessary where the requestor seeks to schedule a later communication session with the member.

In step 220, the engine 156 receives the results from the queried presence services and creates a social network 164 corresponding to the social network request. The subset of members may be further filtered to remove members who are not currently present and/or available. The search results are provided to the requestor 148 via the requestor's communication device 116.

Figure 2:
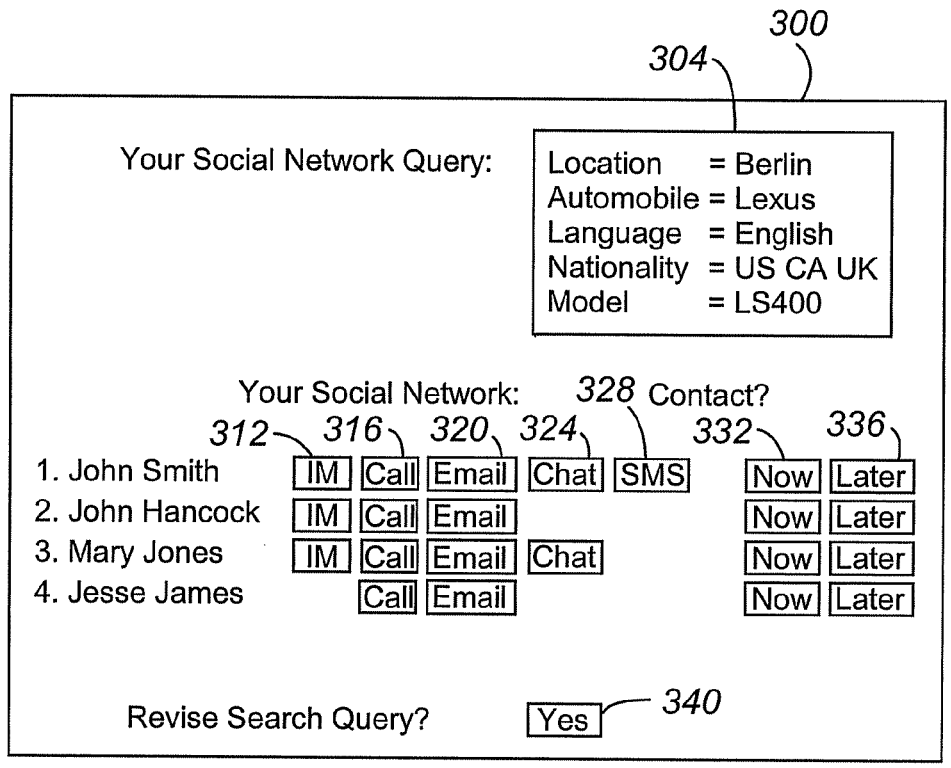
FIG. 2 is a screenshot according to an embodiment of the present invention.
Figure 3:
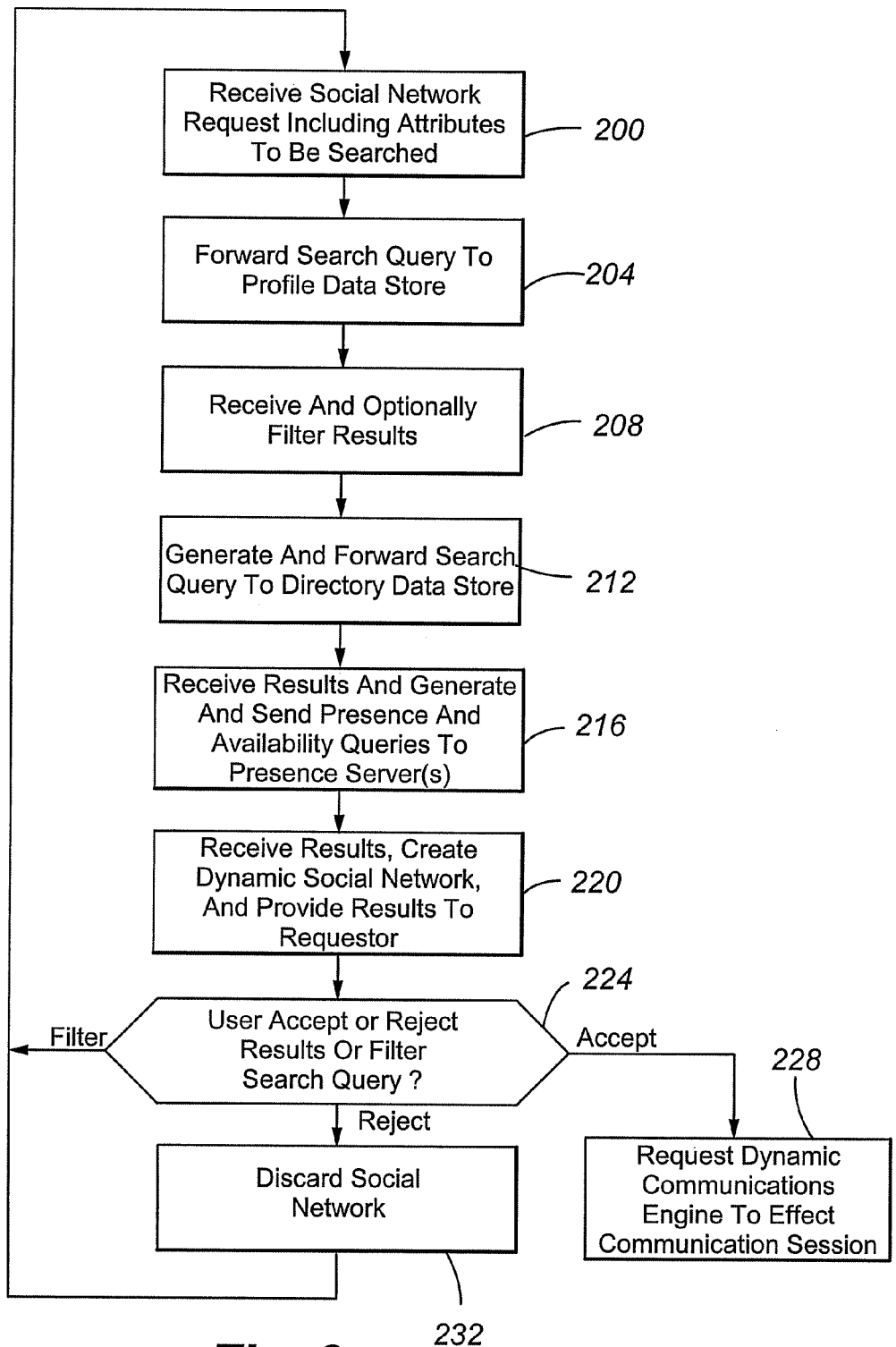
FIG. 3 is a flowchart according to an embodiment of the present invention.

FIG. 2 depicts a possible display provided to the requestor by the requestor's communication device 116. The display 300 includes the searched attributes in window 304. In this case, the searched attributes are:
 Location=Berlin
 Automobile=Lexus
 Language=English
 Nationality=US CA UK
 Model=LS400

These attributes in the network request seek those social network members knowledgeable about the Lexus LS400, who reside in Berlin, Germany, speak English, and are citizens of the United States, Canada, or the United Kingdom. The results are listed in section 308. The individuals are ranked in an order indicating a "best fit". The ranking may be done based on any suitable criteria, such as similarity of member's profile to the profile of the requestor, the closeness of the match to the intended, stated, or assumed purpose of the request, purpose of the communication session and urgency or level of importance. The icons 312 (which corresponds to instant messaging), 316 (which corresponds to live voice call), 320 (which corresponds to email), 324 (which corresponds to chat), and 328 (which corresponds to SMS) show the communication modalities available to each listed member. For a specific member, a communication modality is selected by clicking on the associated icon. Each member further has a corresponding set of icons indicating whether to contact the member now (icon 332) or later (icon 336). To select a member, the requestor selects a contact modality icon 312, 316, 320, 324, and 328 and a contacting timing icon 332 or 336. Any member not selected is not included in any later communication session arising from the network request. If the contact later icon 336 is selected, a child menu appears requesting the requestor to provide the information needed for an invitation to be generated by a scheduling application (not shown) and sent to the selected member. The information needed is the same as that noted above. If none of the listed members are satisfactory or if too many members are identified, the requestor may select the yes icon 340 to have search window reappear to modify the social network query to be transmitted again to the server 120. The display 300 may include additional information, such as a role identifier, why the member was chosen (e.g., he owns/drives an LS400, he is a Lexus automotive dealer, he is a Lexus mechanic, etc.), and the like.

Referring again to FIG. 3 in decision diamond 224, the social networking engine 156 determines whether the requestor has accepted or rejected the listed results or requested that the search request be modified. If the search request is to be modified (filtered), the engine 156 returns to and repeats step 200. If the search request is to be rejected (e.g., by terminating the session with the engine 156 or timing out), the social networks are discarded in step 232, and the engine returns to and repeats step 200. If the search results are acceptable, the engine 156 requests the dynamic communication engine 160 to schedule and/or effect the selected communication sessions.

Figure 4:
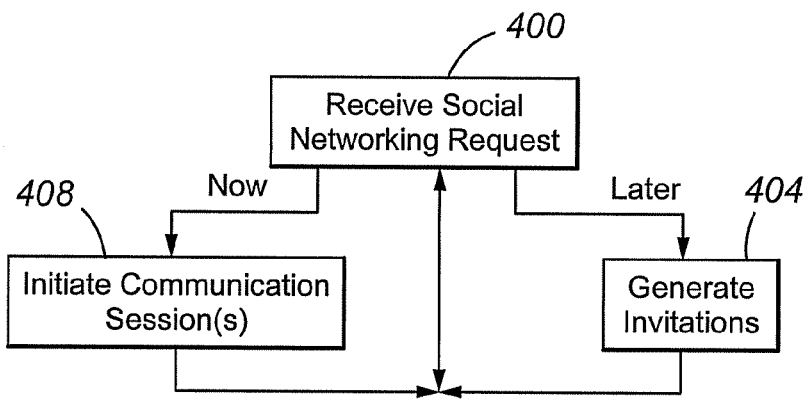
FIG. 4 is a flowchart according to an embodiment of the present invention.

Referring now to FIG. 4, the engine 160 receives the request in step 400. If the communication session is to be scheduled for a later time, the engine 160, in step 404, generates invitations with the fields populated with the information received from the requestor. If the communication session is to be conducted for now, the engine 160 initiates the session in step 408. Where multiple members are to be contacted simultaneously, the engine 160 sets up a conference call, multi-recipient instant message, multi-recipient email, or chat.

The engine 160 then returns to and repeats step 400 when the next communication request is received from the social networking engine 156.

The Electronic Scheduler Embodiment

Figure 5:
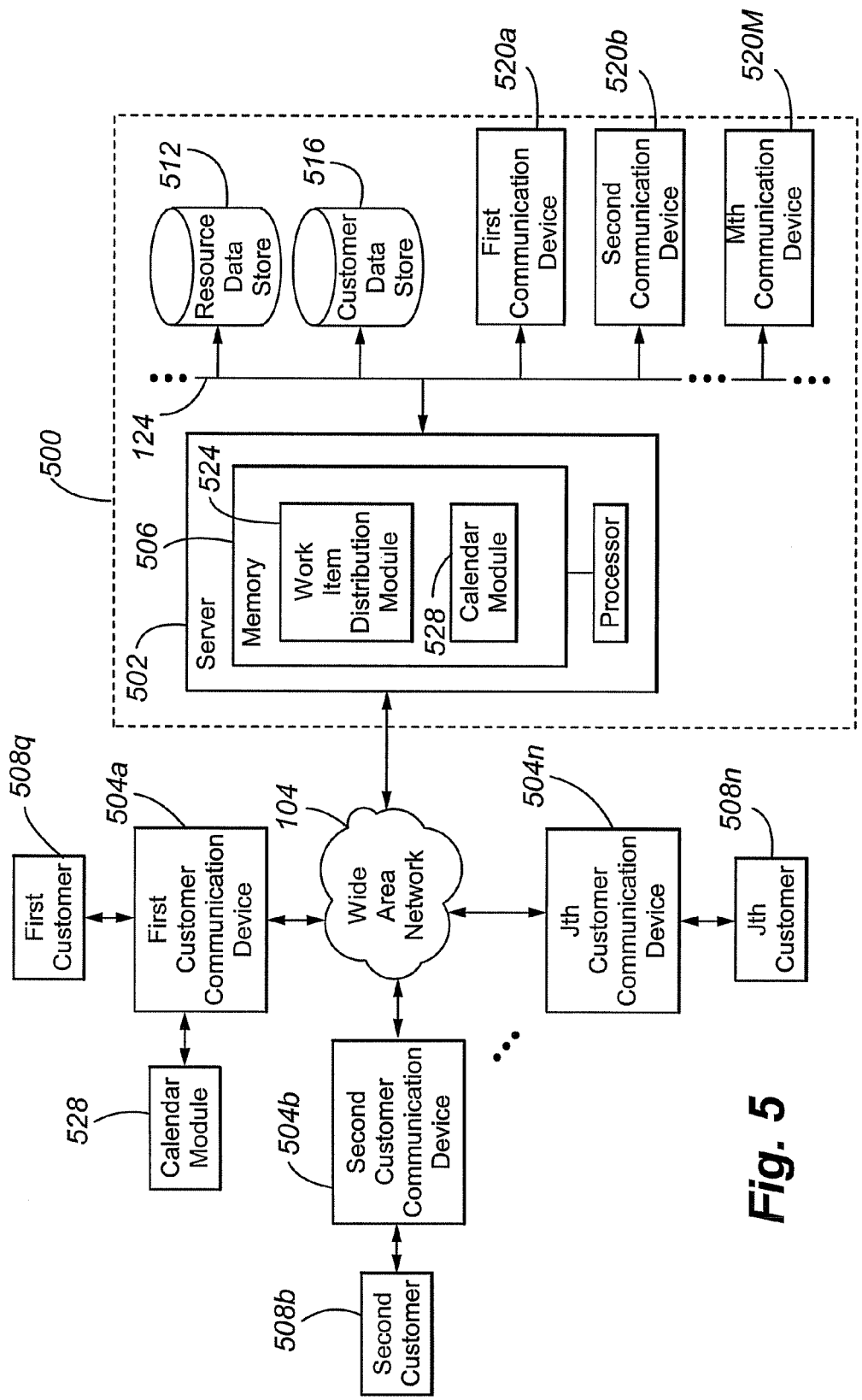
FIG. 5 is a block diagram of an architecture according to an embodiment of the present invention.

Referring now to FIG. 5, a further embodiment of the present invention will be discussed. An enterprise network 500, particularly a contact center, is in communication, via WAN 104, with a first, second, . . . nth customer communication devices 504*a-n*. The communication devices 504*a-n* are external to the enterprise network 500 and can be any of the communication devices noted above. Each of the communication devices is associated with a corresponding customer 508*a-n*. The enterprise network 500 includes a number of additional components. The network 500 includes a server 502 connected via LAN 124 to a resource data store 512, customer data store 516, and first, second, . . . mth communication devices 520*a-m*.

The server 502 directs communications, such as incoming Voice Over IP or VoIP and telephone calls, in the enterprise network 500. The term "server" as used herein should be understood to include a PBX, an ACD, an enterprise switch, an enterprise server, or other type of telecommunications system switch or server, as well as other types of processor-based communication control devices such as media servers, computers, adjuncts, etc. The server 502 can be any architecture for directing contacts to one or more communication devices. Illustratively, the server 502 of FIG. 5 can be Avaya Inc.'s Definity™ Private-Branch Exchange (PBX)-based ACD system; MultiVantage™ PBX, CRM Central 2000 Server™, Communication Manager™, S8300™ media server, SIP Enabled Services™, and/or Avaya Interaction Center™. The server 502 typically is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The server 502 comprises a network interface card to provide services to the associated internal enterprise communication devices.

The resource data store 512 includes resource information regarding resources, such as employees or (human) agents, of the enterprise managing the network 500. Resource information includes, for example, a profile for each resource, respectively, that includes individual enterprise identifier, individual name, address, communication device information, personal information (e.g., age, sex, hobbies, physical condition, spoken languages, ethnicity, geographic area of expertise, etc.), individual skills and/or areas of expertise, day(s) and time(s) during which and/or areas in which the resource may be contacted to service customer contacts and/or a number of times over a selected period in which the resource may be contacted to service customer contacts, contact information (e.g., electronic address of corresponding communication device(s), types of communication devices (e.g., cell phone, desk phone, laptop, etc.), organization hierarchy or role identifier, group identifier, and job description. The organization hierarchy or role identifier typically indicates the relative position, or degree of importance, of the resource to the enterprise while the group identifier indicates to which sets of employees the resource belongs. Generally, employees having similar job titles or descriptions and/or common levels of importance to the enterprise will be in a common employee grouping.

The customer data store includes customer information such as customer name, customer social security number, customer account number, customer preferences (such as language to be used for interacting with the customer, desired sex of servicing resource, level of proficiency in a language, and religion preference), financial information (such as net worth, gross annual earnings, net annual earnings, account balances, customer bank account and credit card information, etc.), number of family members and/or their ages, sex of customer, age of customer, health information (allergies, medical history, current medical condition, etc.), number or electronic address to which a return contact is to be directed (which is different from the number of electronic address of the contacting customer communication device), customer business address, customer home address, customer policy number, customer license number, and the like.

Each resource is associated with one of the first, second, . . . mth communication devices 520*a-m*. The devices are internal to the enterprise network and include any of the types of devices noted previously. Each resource may further have one or more external communication devices. Each resource is a subscriber of the enterprise network 500. As used herein, a "subscriber" refers to a person who is serviced by, registered or subscribed with, or otherwise affiliated with an enterprise network.

It should be noted that the above embodiments do not require any particular type of information transport medium or protocol between the server and internal communication devices, i.e., the invention may be implemented with any desired type of transport medium as well as combinations of different types of transport media.

Although the above embodiments are discussed with reference to a client-server architecture, it is to be understood that the principles of the present invention apply to other network architectures. For example, the invention applies to peer-to-peer networks, such as those envisioned by the Session Initiation Protocol. In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Moreover, the invention does not require a specific Internet Protocol Telephony (IPT) protocol and could be implemented, for example, using QSIG, H.323, and combinations thereof. Additionally, the invention does not require the presence of packet- or circuit-switched networks.

Included within the memory 506 of the server 502 is a calendar or scheduling module 528, such as an electronic calendar, and a work item distribution module 524. The first customer 508*a* also has a corresponding calendar module 528.

The calendar module 128 receives and executes scheduling requests and updates and meeting invitations from a subscriber. The module 528 can be any suitable scheduling application modified according to the principles of the present invention. Examples include Outlook™ by Microsoft. A typical calendar module includes a set of data structures to contain scheduling information. The data structures include a number of sets of scheduling records for each subscriber. Each set of scheduling records includes a set of calendar files. Each calendar file corresponds to a selected month and year and includes, for each day in the respective month and year, a series of discrete timeslots. Each timeslot corresponds to a discrete time period of a set length, e.g., fifteen, thirty, or sixty minutes. Each timeslot may have an associated set of parameters, such as a task to be performed, a meeting, a list of meeting participants, a subject of the meeting, an agenda for the meeting, attachments for the meeting, a duration of the meeting, contact details for the meeting (e.g., a telephone number of a meeting participant, conference bridge, and the like), and physical location. The parameters are typically referenced in the appropriate timeslot by a pointer.

The work distribution module 524 receives scheduling requests from customer communication devices 504, selects a set of resources to possibly service the work item associated with the scheduling requests, obtains scheduling information from the calendar module 528 regarding each member of the resource set, provides information about each member of the resource set, including scheduling information, to the requesting customer, obtains a customer selected member, and coordinates with the calendar module 528 to set up a meeting time and reserve any needed animate and inanimate resources for the meeting, such as conference rooms, electronic equipment, and the like. Resources are selected typically based on the role and/or group identifier. A resource, depending on his or her expertise (e.g., skill and/or skill level), may be in multiple roles or groups. Each resource may configure preferences defining the circumstances under which he or she may be selected. The preferences indicate rules pursuant to which the associated subscriber is or is not available for "blindly" scheduled meetings. The rules may be requestor-based (based on the identity or type of customer), subject matter-based (based on the subject area of the work item), or time-based (based on the time requested by the customer in which to service the work item).

The work item distribution module 524 and enterprise calendar module 528 collectively enable a customer to schedule a meeting with an unknown resource. The module 524, acting on behalf of the requestor, selects a set of resources for consideration by the requestor. The module 524 further provides sufficient information to the requestor to permit the requestor to make an educated selection of a subset of the members to service his or her needs. In effect, the module 524 and module 528 provide intelligent auto-attendant functionality for the enterprise network 500.

Figure 7:
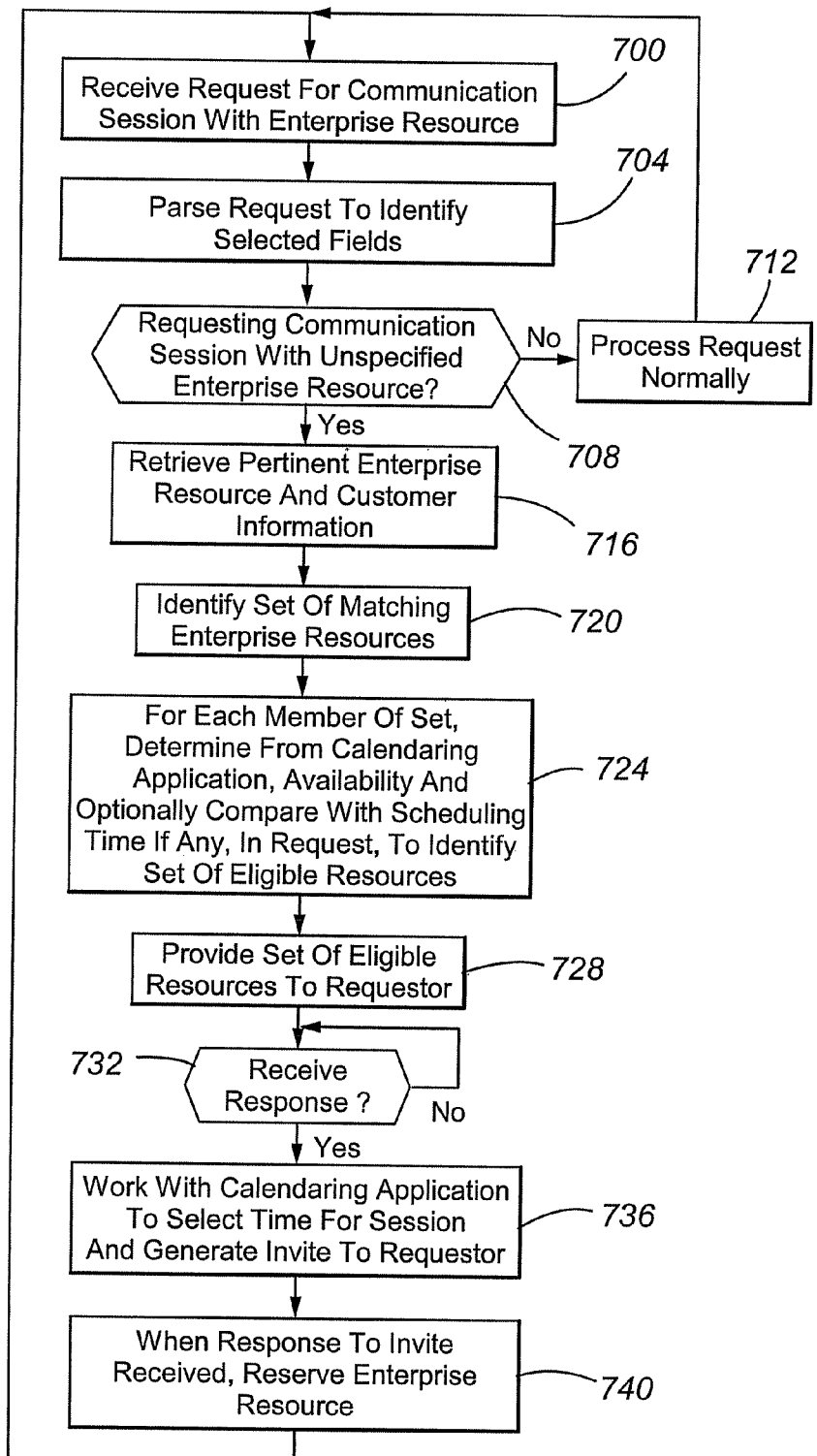
FIG. 7 is a flowchart according to an embodiment of the present invention.

The operation of this embodiment will now be discussed with reference to FIG. 7.

In step 700, a meeting request is forwarded by an electronic calendar module 528 of a customer (who is an existing or potential customer) or some other application and received by the enterprise network 500. The addressee of the request may be a general email box, the server 502, the work item distribution module 524, or the enterprise calendar module 528 of the enterprise network 500. The scheduling request includes various fields, including requested meeting time(s), meeting type (e.g., by phone, instant messaging session, face-to-face, etc.), requestor (sender or customer) contact information, requestor identification, and meeting purpose (e.g., work item description).

When the electronic meeting request is received by the enterprise network 500, the request is parsed, in step 704, to identify the various selected fields.

In decision diamond 708, the work item distribution module 524 determines whether the request is requesting a communication session with an unspecified enterprise resource. If not, the module 524, in step 712, processes the request normally, which typically means that the request is forwarded directly to the named resource. If the request is directed to an unnamed resource, the work item distribution module 524 selects an appropriate resource group and, optionally, group member to service the work item described in the request. The selection process typically requires the module 524, in step 716, to retrieve the pertinent enterprise resource and customer information from the data stores 512 and 516. The customer information retrieved is for the customer referenced in the request while the enterprise resource information retrieved is based, for example, on prior customer affiliation and skill(s) required to service the described work item and, in step 720, to identify a set of enterprise resources to service the work item.

In step 724, the module 524 forwards a query, for each member of the set, to the calendar module 528 requesting his or her availability during the times, if any, specified in the customer request. If no specific times are specified in the request, the module 528 provides a default time frame for the query. The enterprise network's calendar module 528, using information in the query and group member availability information in each selected member's associated calendar, selects one or more possible meeting times for servicing of the work item. The results are then returned to the module 524.

In step 728, the module 524 then assembles and returns a response to the requestor containing not only possible meeting times but also other meeting information, such as meeting type, group member identification, group member information (such as qualifications), and group member contact information. The response may be transmitted with or without prior approval of the respective selected member for the requested meeting. In this sense, the selection and scheduling process is performed "blindly" or automatically without the selected member's knowledge. In one configuration, the selected may have the ability to screen or edit the response before it's transmission to the requestor.

FIG. 6 depicts a display 600 according to an embodiment of the invention. The display 600 lists, in a selected order, the names of the resources and, for each named resource, provides the position or title and availability information. A selection icon 604a-d is provided next to each named resource for the customer to select that resource. In the display 600, the customer has selected John Hancock but not John Smith, Mary Jones, or Jesse James. The order or ranking of the listed members can be based on any suitable criteria, including the similarity of member's profile to the profile of the requestor, the closeness of the match to the intended, stated, or assumed purpose of the request, and the desirability to the enterprise of having the named resource service the work item in the request. At the bottom of the display 600, there is a send icon 608 that, if selected, sends a response to the enterprise network 500 and a new search icon 612 that, if selected, indicates to the network 500 that none of the listed individuals are satisfactory. If the new search icon 612 is selected, a further display (not shown) is provided asking the customer to refine his or her search.

In decision diamond 732, the module 524 determines whether or not a response has been received from the customer. If not, the diamond 732 is repeated after a selected time interval until the module 524 times out. If a response has been received, the module 524 proceeds to step 736.

In step 736, the module 524, working with the calendar module 528, selects a time for the work item to be serviced and generates an invitation to the requestor.

In step 740, when a response to the invitation is received, the meeting time is confirmed in the selected resource's calendar and a meeting confirmation sent to the customer. The resource then services the customer's work item at the scheduled time and place and by the selected communication modality.

The exemplary systems and methods of this invention are described in relation to a distributed processing network. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show certain of the various components of the system as being collocated, certain components of the system can be located remotely, at distant portions of a distributed network, such as a LAN and/or the Internet, or within a dedicated system. Thus, it should be appreciated, that the components of the system can be combined in to one or more devices, such as a communication device rather than a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of other variations and modifications of the invention can be used. It would be possible to provide for some features of the invention without providing others. For example in one alternative embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations, combinations, and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) an enterprise network receiving, from a communication device of a requestor, an electronic request for a meeting with an unspecified enterprise resource;
   (b) in response, the enterprise network automatically detecting presence of a set of possible enterprise resources and selecting, from among the set of possible enterprise resources, a preferred subset of enterprise resources to interact with the requestor, the selection being based on information contained in the electronic request and presence information obtained from a presence service, wherein the presence information indicates a communication context for detecting the set of possible enterprise resources and a suggested communication modality to successfully reach the enterprise resources;

(c) transmitting, by the enterprise network, to the communication device of the requestor a message containing a ranked list of members of the preferred subset of enterprise resources and one or more possible meeting times between the requestor and each respective subset member in the ranked list, the one or more possible meeting times being determined at least in part by reference to the presence information; and (d) receiving, at the enterprise network and from the communication device of the requestor, a selection of one or more members of the ranked list of members and a selected meeting time for a meeting with the selected one or more members.

2. The method of claim 1, wherein the subset members are selected by the enterprise network based on one or more of resource skills, resource availability, resource preferences, a role identifier of the resource in the enterprise, prior interaction between the requestor and resource, a group identifier of the resource, requestor importance to the enterprise, and a need of the requestor in the request.

3. The method of claim 1, wherein the request is generated by an electronic calendar module of the requestor and the selected meeting time is transmitted by the requestor's electronic calendar module to the enterprise network.

4. The method of claim 1, wherein the ranking is based on one or more of a similarity of a member profile of each member of the preferred subset of enterprise resources to a requestor profile of the requestor; an urgency of the electronic request;

and a level of importance of the electronic request.

5. The method of claim 1, wherein the request comprises a plurality of requested meeting time(s), meeting type, requestor contact information, requestor identification, and meeting purpose, and wherein the message returned to the requestor in step (c) comprises a plurality of meeting type, selected resource qualification(s), and selected resource contact information.

6. A server, comprising:
a microprocessor; and
a computer readable medium, coupled to the microprocessor, comprising instructions that program the microprocessor to:
receive, from a communication device of a requestor, an electronic request for a meeting with an unspecified enterprise resource;
in response, automatically detect presence of a set of possible enterprise resources;
select, from among the set of possible enterprise resources and based on information contained in the electronic request and presence information obtained from a presence service, a preferred subset of enterprise resources to interact with the requestor, wherein the presence information indicates a communication context for detecting the set of possible enterprise resources and a suggested communication modality to successfully reach the enterprise resources; and
transmit to the communication device of the requestor a message containing a ranked list of members of the preferred subset of enterprise resources and one or more possible meeting times between the requestor and each respective subset member in the ranked list, the one or more possible meeting times being determined at least in part by reference to the presence information; and
receive, from the communication device of the requestor, a selection of one or more members of the ranked list of members and a selected meeting time for a meeting with the selected one or more members.

7. The server of claim 6, wherein the micprocessor bases the selection on information contained in the electronic request.

8. The server of claim 6, wherein the microprocessor receives the possible meeting times from an electronic calendar module at an enterprise network and wherein the possible meeting times are based on an electronic calendar of each member of the preferred subset of enterprise resources.

9. The server of claim 8, wherein the ranked list further comprises one or more available communication modalities for each respective subset member in the ranked list.

10. The server of claim 9, wherein the microprocessor selects the subset members based on one or more of resource skills, resource availability, resource preferences, a role identifier of the resource in the enterprise, prior interaction between communication devices of the requestor and resource, a group identifier of the resource, requestor importance to the enterprise, and a need of the requestor in the request.

11. The method of claim 9, wherein the server receives the request from an electronic calendar module of the requestor and the selected meeting time is transmitted by the requestor's electronic calendar module to the server.

12. The method of claim 11, wherein the request comprises a plurality of requested meeting time(s), meeting type, requestor communication device contact information, requestor identification, and meeting purpose, and wherein the message transmitted to the communication device of the requestor comprises a plurality of meeting type, selected resource qualification(s), and selected resource contact information.

13. A server comprising:
a microprocessor; and
a computer readable medium, coupled to the microprocessor, comprising instructions that cause the microprocessor to:
receive, from a communication device of a requestor, an electronic request for a meeting with an unspecified enterprise resource;
select, from among the set of possible enterprise resources and based on presence information obtained from a presence service, a preferred subset of enterprise resources to interact with the requestor, wherein the presence information indicates a communication context for detecting the set of possible enterprise resources;
determine, based on the presence information, one or more possible meeting times between the requestor and each respective subset member;
transmit a ranked list of members of the preferred subset of enterprise resources, together with the one or more possible meeting times, to the communication device of the requestor; and
receive, from the communication device of the requestor, a selection of one or more members of the ranked list of members and a selected meeting time for a meeting with the selected one or more members.

14. The server of claim 13, wherein the micprocessor further bases the selection on information contained in the electronic request.

15. The server of claim 14, wherein the microprocessor receives the possible meeting times from an electronic calendar module at an enterprise network and wherein the possible meeting times are based on an electronic calendar of each member of the preferred subset of enterprise resources.

16. The server of claim 14, wherein the ranked list further comprises one or more available communication modalities for each respective subset member in the ranked list.

17. The server of claim 13, wherein the microprocessor selects the subset members based on one or more of resource skills, resource availability, resource preferences, a role identifier of the resource in the enterprise, prior interaction between communication devices of the requestor and resource, a group identifier of the resource, requestor importance to the enterprise, and a need of the requestor in the request.

18. The method of claim 13, wherein the server receives the request from an electronic calendar module of the requestor and the meeting time is transmitted by the requestor's electronic calendar module to the server.

19. The method of claim 18, wherein the request comprises a plurality of requested meeting time(s), meeting type, requestor communication device contact information, requestor identification, and meeting purpose, and wherein the message transmitted to the communication device of the requestor comprises a plurality of meeting type, selected resource qualification(s), and selected resource contact information.

* * * * *

UNITED STATES PATENT AND TRADEMARK OFFICE
CERTIFICATE OF CORRECTION

PATENT NO. : 10,671,600 B1
APPLICATION NO. : 11/864189
DATED : June 2, 2020
INVENTOR(S) : David Charles Bengtson et al.

Page 1 of 1

It is certified that error appears in the above-identified patent and that said Letters Patent is hereby corrected as shown below:

In the Claims

At Column 20, Line 3, please delete "micprocessor" and insert --microprocessor-- therein.

At Column 20, Line 62, please delete "micprocessor" and insert --microprocessor-- therein.

Signed and Sealed this
Eighth Day of September, 2020

Andrei Iancu
*Director of the United States Patent and Trademark Office*